US006963573B1

(12) United States Patent
Cain et al.

(10) Patent No.: US 6,963,573 B1
(45) Date of Patent: Nov. 8, 2005

(54) SYSTEM, DEVICE, AND METHOD FOR RECEIVER ACCESS CONTROL IN A MULTICAST COMMUNICATION SYSTEM

(75) Inventors: Bradley Cain, Cambridge, MA (US); Thomas P. Hardjono, Winchester, MA (US)

(73) Assignee: Nortel Networks Limited, (CA)

( * ) Notice: Subject to any disclaimer, the term of this patent is extended or adjusted under 35 U.S.C. 154(b) by 695 days.

(21) Appl. No.: 09/660,688

(22) Filed: Sep. 13, 2000

(51) Int. Cl.[7] .................. H04L 12/54; H04L 12/56; G06F 15/16
(52) U.S. Cl. ............... 370/401; 370/393; 370/408; 709/229
(58) Field of Search .................. 370/231–236, 370/352–393, 337, 349, 400, 401, 432, 409; 709/200, 204, 225–229, 224, 238–245; 713/163, 713/201

(56) References Cited

U.S. PATENT DOCUMENTS

| | | | |
|---|---|---|---|
| 5,331,637 A * | 7/1994 | Francis et al. ............ | 370/408 |
| 6,049,878 A * | 4/2000 | Caronni et al. ........... | 713/201 |
| 6,097,720 A * | 8/2000 | Araujo et al. ............ | 370/355 |
| 6,233,618 B1 * | 5/2001 | Shannon .................. | 709/229 |
| 6,307,861 B1 * | 10/2001 | Hogg et al. .............. | 370/432 |
| 6,330,671 B1 * | 12/2001 | Aziz ..................... | 713/163 |
| 6,457,059 B1 * | 9/2002 | Kobayashi ............... | 709/242 |
| 6,578,076 B1 * | 6/2003 | Putzolu .................. | 709/223 |
| 6,580,722 B1 * | 6/2003 | Perlman .................. | 370/432 |
| 6,611,864 B2 * | 8/2003 | Putzolu et al. ........... | 709/223 |
| 2001/0018714 A1 * | 8/2001 | Yagyu et al. ............. | 709/245 |
| 2003/0165140 A1 * | 9/2003 | Tang et al. .............. | 370/393 |
| 2004/0044762 A1 * | 3/2004 | Peacock ................. | 709/224 |

OTHER PUBLICATIONS

Fenner "Internet Group Management Protocol, Version 2" Internet Engineering Task Force Request for Comments: 2236 Nov. 1997.
Estrin et al. "Protocol Independent Multicast—Sparse Mode (PIM-SM): Protocol Specification" Internet Engineering Task Force Request for Comments: 2362 Jun. 1998.
Deering et al. "Protocol Independent Multicast Version 2 Dense Mode Specification" Internet Engineering Task Force Internet Draft draft-ietf-pim-v2-dm-03.txt Jun. 7, 1999.
Durham et al. "The COPS (Common Open Policy Service) Protocol" Internet Engineering Task Force Request for Comments: 2748 Jan. 2000.
Cain et al. "Internet Group Magnement Protocol, Version 3" Internet Engioneering Task Force Internet Draft draft-ietf-idmr-igmp-v3-04.txt Jun. 2000.

* cited by examiner

*Primary Examiner*—Man U. Phan
(74) *Attorney, Agent, or Firm*—Steubing McGwinness & Manaras LLP

(57) ABSTRACT

A system, device, and method for receiver access control in a multicast communication network uses a policy service to determine whether a subscriber device can be admitted to a multicast group. The subscriber device accesses the multicast communication network via an access device. The access device uses a policy service to obtain a policy decision from a policy server, where the policy decision indicates whether or not the subscriber device can be admitted to the multicast group. The access device enforces the policy decision by admitting the subscriber device to the multicast group if and only if the policy decision indicates that the subscriber device can be admitted to the multicast group.

50 Claims, 11 Drawing Sheets

MAP CLIENT ACCEPT HEADER

MAP POLICY REQUEST MESSAGE

MAP POLICY DECISION MESSAGE 450

MAP POLICY DECISION HEADER

DECISION FLAGS OBJECT 1230

SYSTEM, DEVICE, AND METHOD FOR RECEIVER ACCESS CONTROL IN A MULTICAST COMMUNICATION SYSTEM

CROSS-REFERENCE TO RELATED APPLICATION

The present patent application may be related to the following commonly owned United States patent application, which is hereby incorporated herein by reference in its entirety:

U.S. patent application Ser. No. 09/160,143 entitled SYSTEM, DEVICE, AND METHOD FOR DISTRIBUTING ACCESS CONTROL INFORMATION IN A COMMUNICATION SYSTEM, filed on even date herewith in the names of Bradley Cain and Thomas P. Hardjono.

FIELD OF THE INVENTION

The present invention relates generally to communication systems, and more particularly to receiver access control in a multicast communication system.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One problem that plagues many multicast communication networks is security, or more specifically, the lack thereof. Many multicast communication networks are based upon an anonymous receiver model in which any host can join the shared tree, for example, using multicast group management protocol such as the Internet Group Management Protocol (IGMP). IGMP is described in Fenner, Internet Engineering Task Force (IETF) Request for Comments (RFC) 2236 entitled *Internet Group Management Protocol, Version 2* (November 1997) and in Cain et al., Internet Engineering Task Force (IETF) Internet Draft draft-ietf-idmr-igmp-v3-04.txt entitled *Internet Group Management Protocol, Version 3* (June 2000), which are hereby incorporated herein by reference in their entireties. This anonymous receiver model exposes the shared tree to various types of attacks.

One attempt to protect the shared tree involves the use of data encryption to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Another attempt to protect the shared tree involves the authentication of control messages between multicast routers. Specifically, the multicast routers exchange various control messages for, among other things, joining the shared tree. These control messages are authenticated hop-by-hop according to a predetermined authentication scheme. By authenticating all control messages, only authorized multicast routers are able to join the shared tree.

Unfortunately, neither data encryption nor control message authentication prevents an unauthorized host from joining the shared tree and thereby consuming valuable communication resources. Because authentication operates only between the multicast routers, an unauthorized host can still join the shared tree, specifically by sending a join request, for example, using IGMP or other group management mechanism. The multicast routers establish the appropriate multicast routes for routing multicast packets to the unauthorized host, perhaps even using authentication to perform hop-by-hop authentication. As a member of the shared tree, the unauthorized host receives multicast packets. This is true even if the multicast packets are protected using data encryption, in which case the unauthorized host simply discards the encrypted multicast data.

Thus, a technique for controlling access in a multicast communication network is needed.

SUMMARY OF THE INVENTION

In accordance with one aspect of the invention, a policy service is used to determine whether a subscriber device can be admitted to a multicast group. The subscriber device accesses the multicast communication network via an access device. The access device uses a policy service to obtain a policy decision from a policy server, where the policy decision indicates whether or not the subscriber device can be admitted to the multicast group. The access device enforces the policy decision by admitting the subscriber device to the multicast group if and only if the policy decision indicates that the subscriber device can be admitted to the multicast group.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention uses a policy service to control subscriber (receiver) access to multicast groups. Specifically, each subscriber (receiver) device accesses a multicast network through an access device. The access device implements a policy service in conjunction with a policy server. When a subscriber (receiver) device requests access to a multicast group, the access device uses the policy service to obtain an access control decision from the policy server. In particular, the policy server decides whether to admit the subscriber (receiver) device to the multicast group or reject the subscriber (receiver) device's request, and provides its policy decision to the access device. The access device enforces the policy decision, specifically by admitting the subscriber (receiver) device to the multicast group if and only if the policy decision from the policy server indicates that the subscriber (receiver) device can be admitted to the multicast group.

Figure 1:
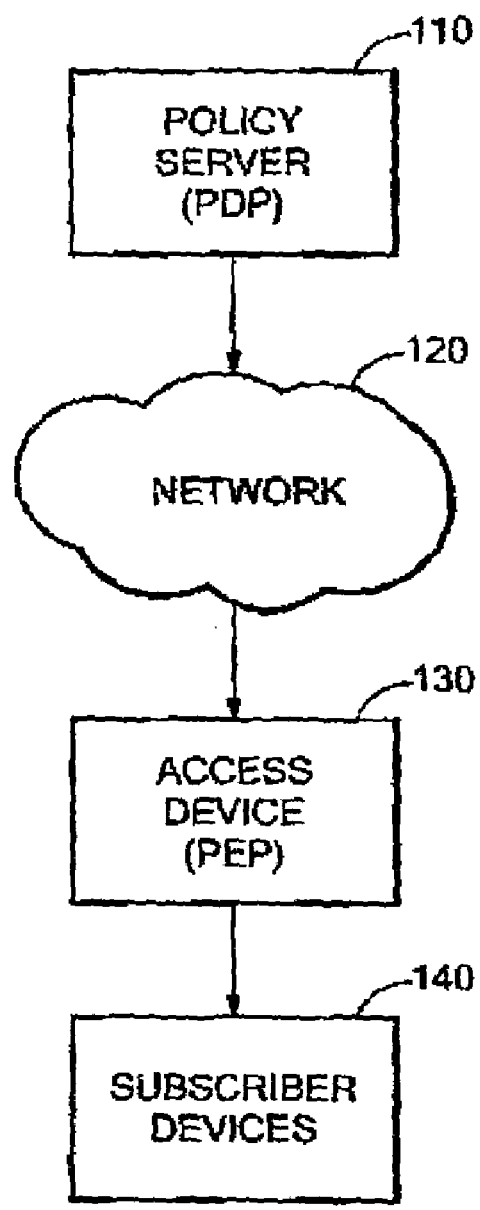
FIG. 1 is a system diagram showing an exemplary communication system in accordance with an embodiment of the present invention.

FIG. 1 shows an exemplary communication system 100. The communication system 100 includes a policy server 110 in communication with an access device 130 such as a router or switch over a network 120. Subscriber devices 140 access the network 120 via the access device 130.

The access device 130 and the subscriber devices 140 implement a multicast group management protocol, such as the IGMP as described in Fenner, Internet Engineering Task Force (IETF) Request for Comments (RFC) 2236 entitled *Internet Group Management Protocol, Version* 2 (November 1997) and in Cain et al., Internet Engineering Task Force (IETF) Internet Draft draft-ietf-idmr-igmp-v3-04.txt entitled *Internet Group Management Protocol, Version* 3 (June 2000), which are hereby incorporated herein by reference in their entireties. With respect to the multicast group management protocol, the access device 130 may be referred to as the Multicast Access Point (MAP) for the subscriber devices 140.

The policy server 110 and the access device 130 implement a policy service protocol, such as the Common Open Policy Service (COPS) as described in the Internet Engineering Task Force (IETF) Request for Comments (RFC) 2748 entitled *The COPS (Common Open Policy Service) Protocol* (January 2000), which is hereby incorporated herein by reference in its entirety. With respect to the policy service, the policy server 110 is commonly referred to as the Policy Decision Point (PDP), and the access device 130 is commonly referred to as the Policy Enforcement Point (PEP). In order to provide for receiver access control in a multicast network, additional signaling mechanisms (described in detail below) are added to the policy service protocol, resulting in a new or extended policy service protocol. In order to differentiate standard policy service protocol messages from new or extended policy service protocol messages, the new or extended policy service protocol messages may be referred to herein as Multicast Access Point (MAP) messages.

The access device 130 typically implements a multicast routing protocol, such as the Protocol Independent Multicast (PIM) multicast routing protocol. PIM is a well-known protocol for routing multicast packets within a multicast routing domain. PIM is so named because it is not dependent upon any particular unicast routing protocol for setting up a multicast distribution tree within the multicast routing domain. PIM has two modes of operation, specifically a sparse mode and a dense mode. PIM Sparse Mode (PIM-SM) is described in Estrin et al., Internet Engineering Task Force (IETF) Request For Comments (RFC) 2362, *Protocol Independent Multicast—Sparse Mode (PIM-SM): Protocol Specification* (June 1998), which is hereby incorporated herein by reference in its entirety. PIM Dense Mode (PIM-DM) is described in Deering et al., Internet Engineering Task Force (IETF) Internet Draft draft-ietf-pim-v2-dm-03.txt, *Protocol Independent Multicast Version* 2 *Dense*

*Mode Specification* (Jun. 7, 1999), which is hereby incorporated herein by reference in its entirety.

The policy server 110 maintains policy information in a policy database. The policy information is used by the policy server 110 to make access control policy decisions. The policy server 110 may obtain the policy information in various ways. For example, the policy information may be configured at the policy server 110 through a management interface, or the policy server 110 may obtain the policy information from a master server (not shown) using a reliable multicast mechanism, as described in the related application. The present invention is in no way limited by the manner in which the policy server 110 obtains the policy information.

In order to participate in the policy service, the access device 130 typically establishes a policy service connection to the policy server 110. In an exemplary embodiment of the present invention, the access device 130 initiates the policy service connection by sending a client open message to the policy server 110. The policy server 110 completes the policy service connection by sending a client accept message to the access device 130 in response to the client open message.

In order to join a multicast group, a subscriber device 140 typically sends a join request to the access device 130 using the multicast group management protocol (e.g., IGMP). The join request identifies the multicast group, for example, using a multicast group address.

When the access device 130 receives the join request from the subscriber device 140, the access device 130 sends a policy service request message to the policy server 110 in order to obtain a policy decision from the policy server 110 indicating whether or not the subscriber device 140 can be admitted to the multicast group. In an exemplary embodiment of the present invention, the policy decision is based upon the incoming interface of the access device 130 over which the join request is received, and therefore the policy service request message indicates at least the incoming interface and the multicast group. In an alternative embodiment of the invention, the policy decision may be based upon the subscriber device 140 itself, in which case the policy service request message would indicate at least the subscriber device 140 and the multicast group.

In any case, when the policy server 110 receives the policy service request message from the access device 130, the policy server 110 decides whether or not the subscriber device 140 can be admitted to the multicast group based upon the information contained in the policy service request message (e.g., incoming interface, subscriber device, incoming interface) as well as policy information stored in the policy database. The policy server 110 sends a policy service decision message to the access device 130 including a policy decision indicating whether or not the subscriber device 140 can be admitted to the multicast group.

When the access device 130 receives the policy service decision message from the policy server 110, the access device 130 enforces the policy decision. Specifically, the access device 130 admits the subscriber device 140 to the multicast group if and only if the policy decision indicates that the subscriber device 140 can be admitted to the multicast group. Admitting the subscriber device 140 to the multicast group typically involves establishing appropriate multicast routes for receiving multicast information and forwarding the multicast information to the subscriber device 140, for example, by joining the multicast group using the multicast routing protocol (e.g., PIM) and setting up appropriate forwarding entries for forwarding the multicast information to the subscriber device 140 over the incoming interface.

Figure 2:
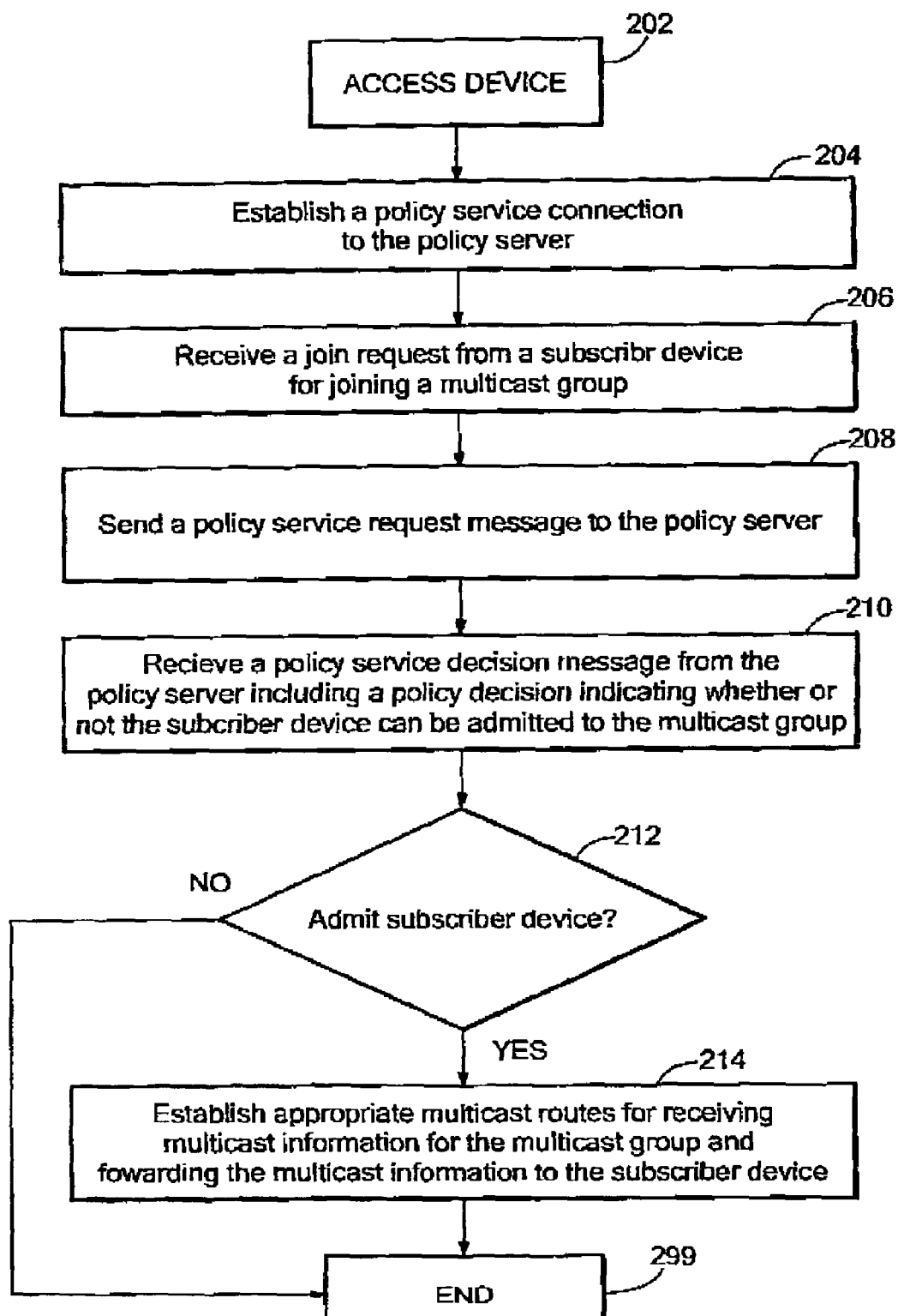
FIG. 2 is a logic flow diagram showing exemplary access device logic for receiver access control in accordance with an embodiment of the present invention.

FIG. 2 shows exemplary access device logic 200 for receiver access control. Beginning at block 202, the logic establishes a policy service connection to the policy server 110, in block 204, for example, by sending a client open message to the policy server 110 and receiving a client accept message from the policy server 110. Upon receiving a join request from a subscriber device for joining a multicast group, in block 206, the logic sends a policy request message to the policy server 110, in block 208. An exemplary policy service request message indicates at least the incoming interface and multicast group for the subscriber device, although the policy service request message may additionally or alternatively indicate other information such as the subscriber device. Upon receiving a policy service decision message from the policy server 110 including a policy decision indicating whether or not the subscriber device can be admitted to the multicast group, in block 210, the logic decides whether or not to admit the subscriber device to the multicast group based upon the policy decison from the policy service decision message, in block 212. If the policy decision indicates that the subscriber device can be admitted to the multicast group (YES in block 212), then the logic admits the subscriber device to the multicast group by establishing appropriate multicast routes for receiving multicast information for the multicast group and forwarding the multicast information to the subscriber device, in block 214. If the policy decision indicates that the subscriber device cannot be admitted to the multicast group (NO in block 212), then the logic does not admit the subscriber device to the multicast group. The logic 200 terminates in block 299.

Figure 3:
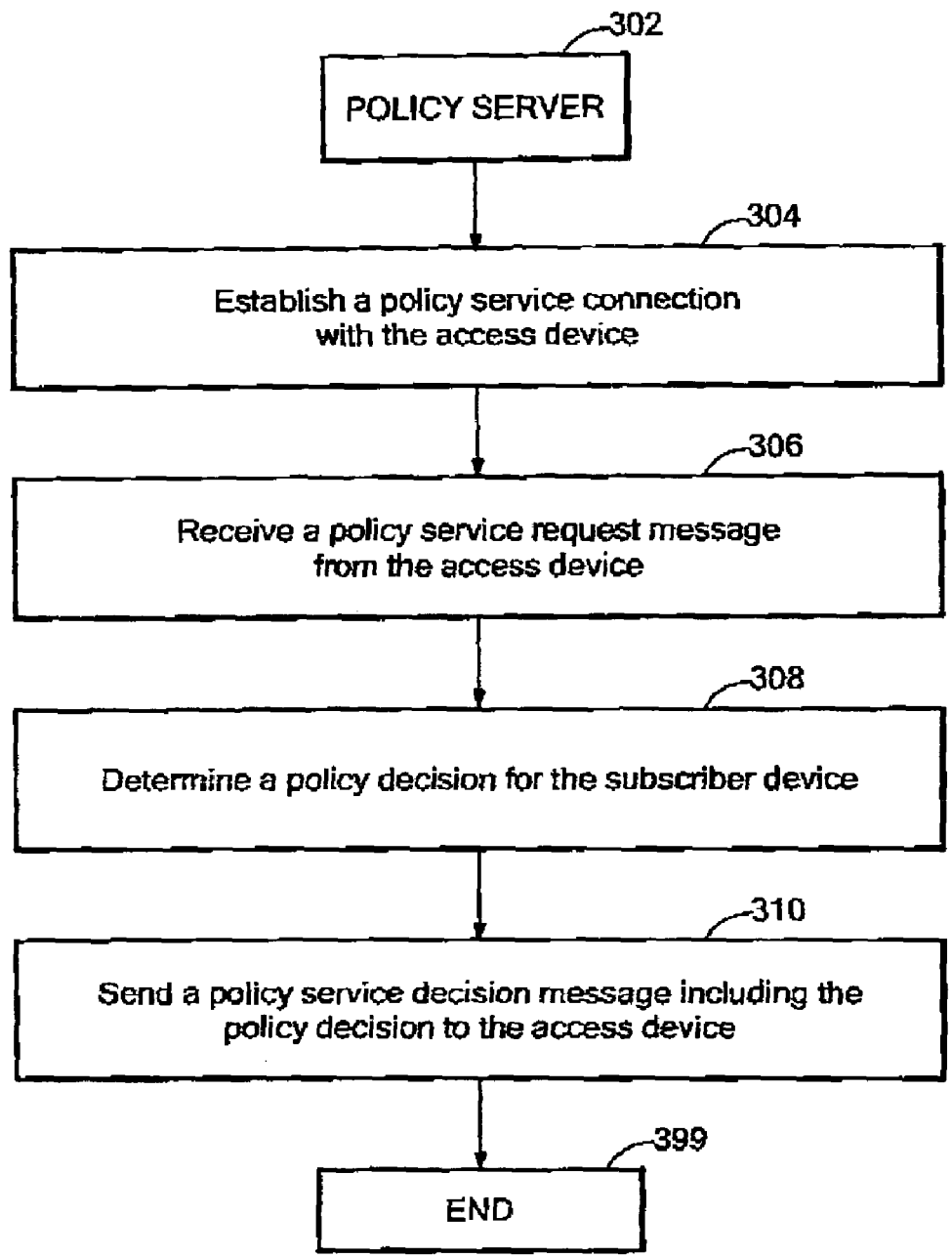
FIG. 3 is a logic flow diagram showing exemplary policy server logic for receiver access control in accordance with an embodiment of the present invention.

FIG. 3 shows exemplary policy server logic 300 for receiver access control. Beginning at block 302, the logic establishes a policy service connection with the access device 130, in block 304, for example, by receiving a client open message from the access device 130 and sending a client accept message to the access device 130. Upon receiving a policy service request message from the access device 130, in block 306, the logic determines a policy decision for the subscriber device, in block 308, based upon information from the policy service request message (e.g., incoming interface, subscriber device, multicast group) as well as policy information obtained from a policy database. The logic sends a policy service decision message including the policy decision to the access device 130, in block 310. The logic 300 terminates in block 399.

Figure 4:
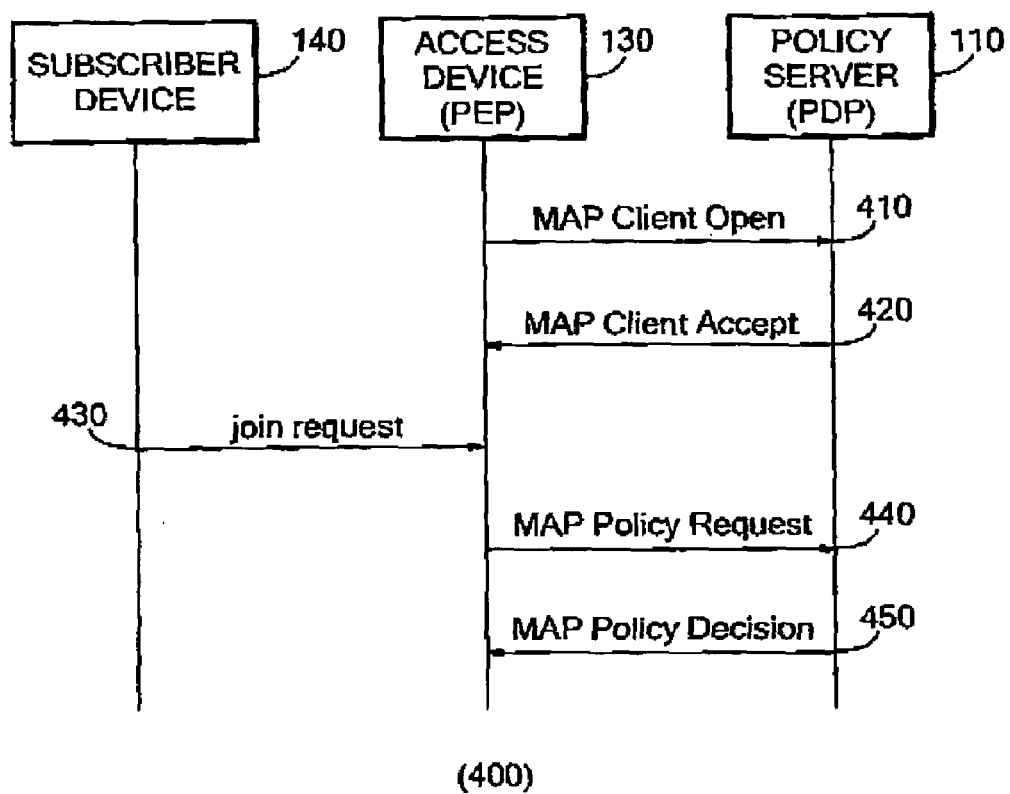
FIG. 4 is a message flow diagram showing exemplary message exchanges between a subscriber device, an access device, and a policy server in accordance with an embodiment of the present invention.

FIG. 4 shows exemplary message exchanges between the subscriber device 140, the access device 130, and the policy server 110. Either before or after receiving a join request 430 from the subscriber device 140, the access device 130 establishes a policy service connection to the policy server 110. In order to establish the policy service connection to the policy server 110, the access device 130 sends a MAP Client Open message 410 to the policy server 110. The policy server 110 completes the policy service connection by sending a MAP Client Accept message 420 to the access device 130. Upon receiving the join request 430 from the subscriber device 140, and after establishing the policy service connection to the policy server 110, the access device 130 sends a MAP Policy Request message 440 to the policy server 110. The MAP Policy Request message 440 indicates at least the incoming interface and multicast group for the subscriber device 140. The policy server 110 determines a policy decision for the subscriber device 140, and sends a MAP Policy Decision message 450 including the policy decision to the access device 130.

In an exemplary embodiment of the present invention, the policy service protocol is a new or extended COPS protocol. The MAP messages used for receiver access control in a multicast network are essentially extended COPS protocol messages. Therefore, as with any COPS protocol message, each MAP message includes a header and a number of objects. In order to provide for receiver access control in a multicast network, a new MAP Client-Type is defined for indicating a MAP client. The MAP Client-Type is included in each MAP message header. A new MAP In-Interface object is defined for including a multicast group address in the MAP Policy Request message 440. A standard Decision Flags object is used in the MAP Policy Decision message 450 for indicating whether to install (admit) or remove (reject) the subscriber device.

Figure 5:
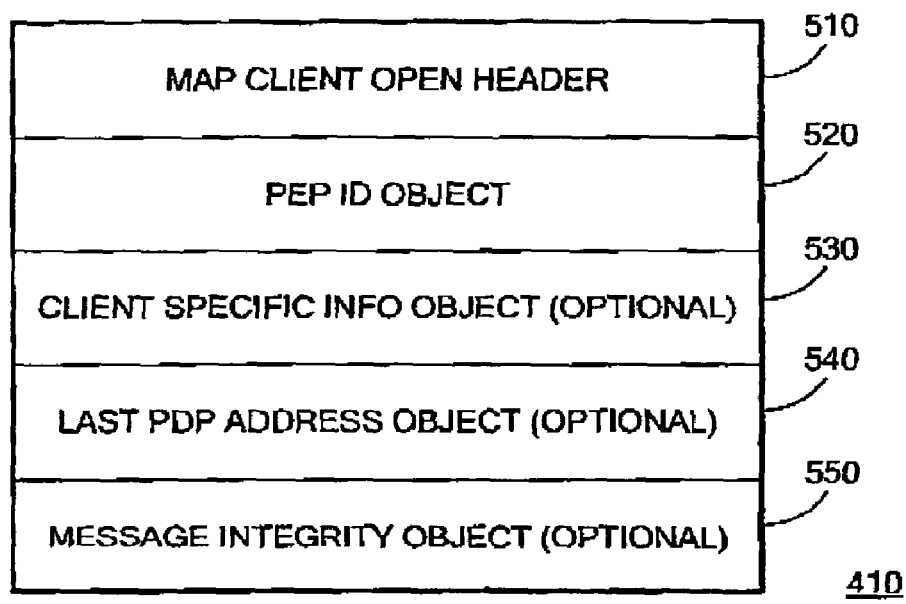
FIG. 5 is a block diagram showing the fields of an exemplary client open message that is sent by the access device to the policy server for opening a policy service connection in accordance with an embodiment of the present invention.

FIG. 5 shows the format of the MAP Client Open message 410. The MAP Client Open message 410 includes a MAP Client Open Header 510, a PEP ID object 520, an optional Client Specific Info object 530, an optional Last PDP Address object 540, and an optional Message Integrity object 550. The MAP Client Open Header 510 is described with reference to FIG. 6 below. The remaining objects are standard COPS objects.

Figure 6:
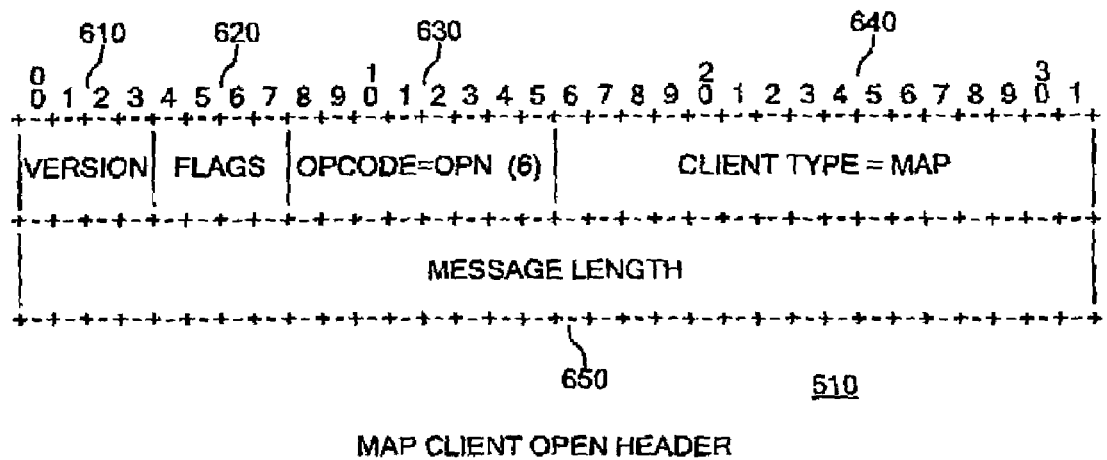
FIG. 6 is a block diagram showing the fields of an exemplary client open message header in accordance with an embodiment of the present invention.

FIG. 6 shows the format of the MAP Client Open Header 510. The MAP Client Open Header 510 includes a version field 610, a flags field 620, an opcode field 630, a client type field 640, and a message length field 650. The opcode field 630 identifies the MAP Client Open message 410 as a COPS client-open (OPN) message (opcode value 6). The client type field 640 indicates a MAP client. The remaining header fields are standard COPS header fields.

Figure 7:
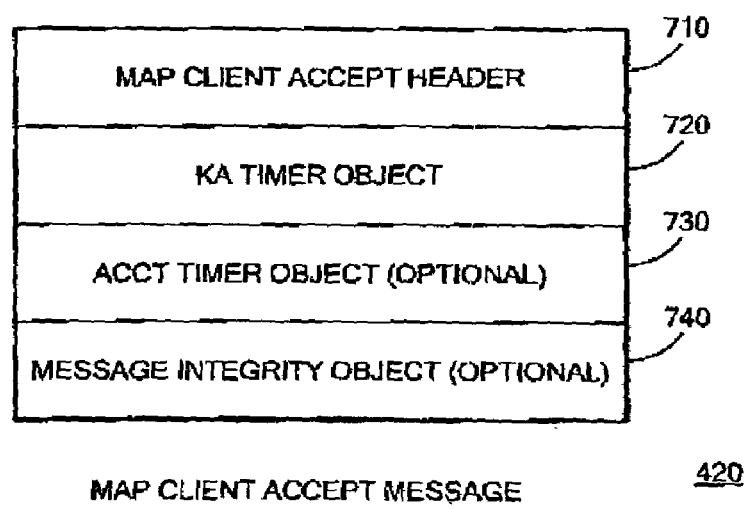
FIG. 7 is a block diagram showing the fields of an exemplary client accept message that is sent by the policy server to the access device for accepting a policy service connection in accordance with an embodiment of the present invention.

FIG. 7 shows the format of the MAP Client Accept message 420. The MAP Client Accept message 420 includes a MAP Client Accept Header 710, a KA Timer object 720, an optional ACCT Timer object 730, and an optional Message Integrity object 740. The MAP Client Accept Header 710 is described with reference to FIG. 8 below. The remaining objects are standard COPS objects.

Figure 8:
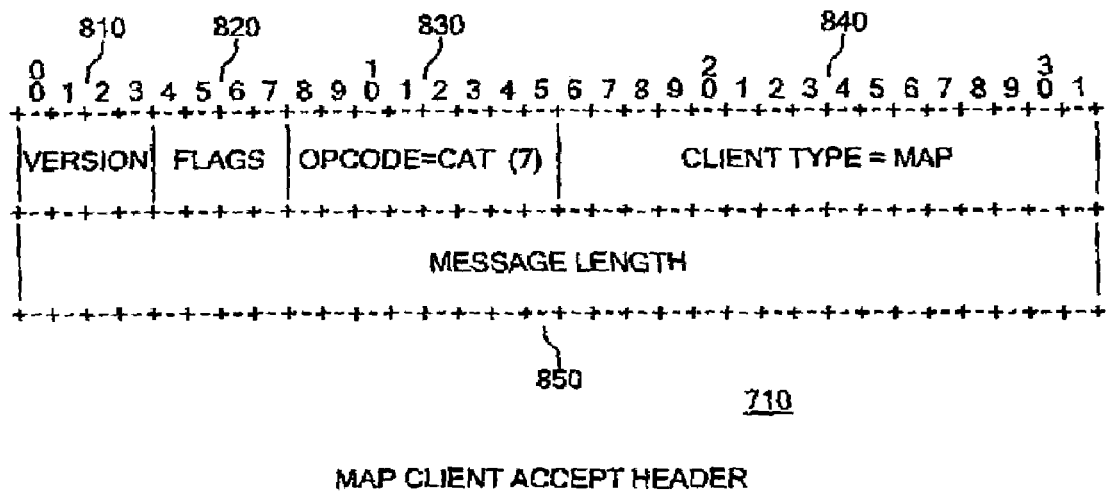
FIG. 8 is a block diagram showing the fields of an exemplary client accept message header in accordance with an embodiment of the present invention.

FIG. 8 shows the format of the MAP Client Accept Header 710. The MAP Client Accept Header 710 includes a version field 810, a flags field 820, an opcode field 830, a client type field 840, and a message length field 850. The opcode field 830 identifies the MAP Client Accept message 420 as a COPS client-accept (CAT) message (opcode value 7). The client type field 840 indicates a MAP client. The remaining header fields are standard COPS header fields.

Figure 9:
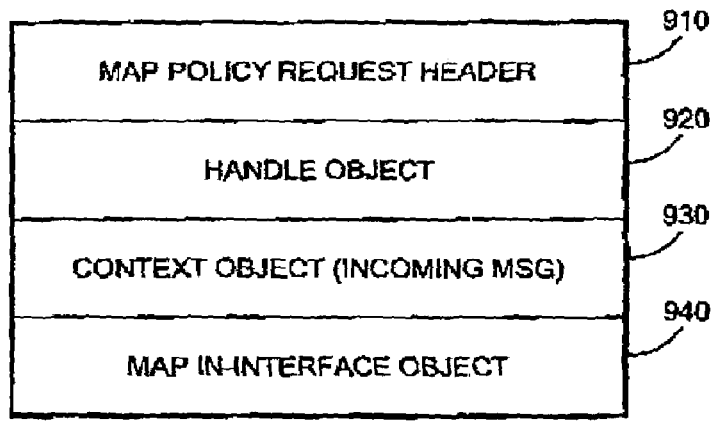
FIG. 9 is a block diagram showing the fields of an exemplary policy request message that is sent by the access device to the policy server to determine whether the access device should admit or reject the subscriber device in accordance with an embodiment of the present invention.

FIG. 9 shows the format of the MAP Policy Request message 440. The MAP Policy Request message 440 includes a MAP Policy Request Header 910, a Handle object 920, a Context object 930, and a MAP Incoming Interface (In-Interface) object 940. The MAP Policy Request Header 910 is described with reference to FIG. 10 below. The MAP In-Interface object 940 is described with reference to FIG. 11 below. The remaining objects are standard COPS objects. The Context object 930 is set to indicate an incoming message.

Figure 10:
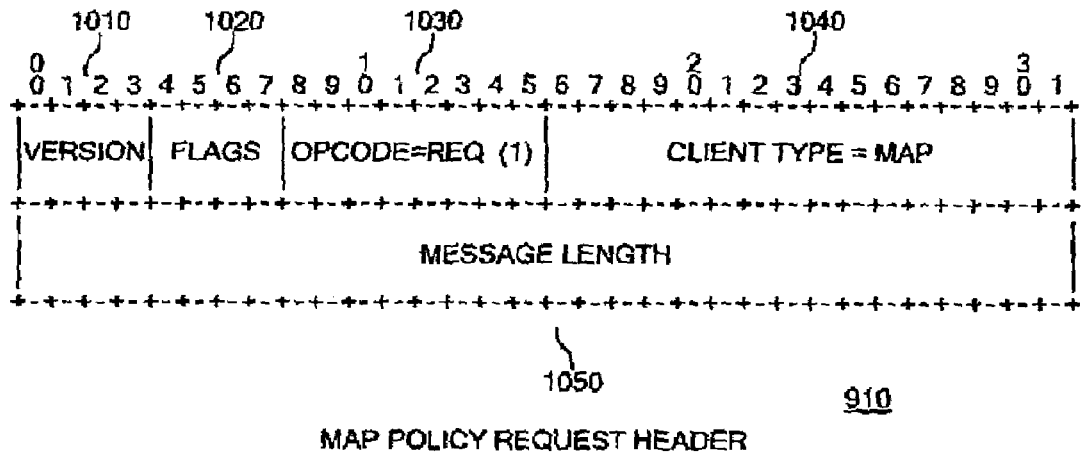
FIG. 10 is a block diagram showing the fields of an exemplary policy request message header in accordance with an embodiment of the present invention.

FIG. 10 shows the format of the MAP Policy Request Header 910. The MAP Policy Request Header 910 includes a version field 1010, a flags field 1020, an opcode field 1030, a client type field 1040, and a message length field 1050. The opcode field 1030 identifies the MAP Policy Request message 440 as a COPS request (REQ) message (opcode value 1). The client type field 1040 indicates a MAP client. The remaining header fields are standard COPS header fields.

Figure 11:
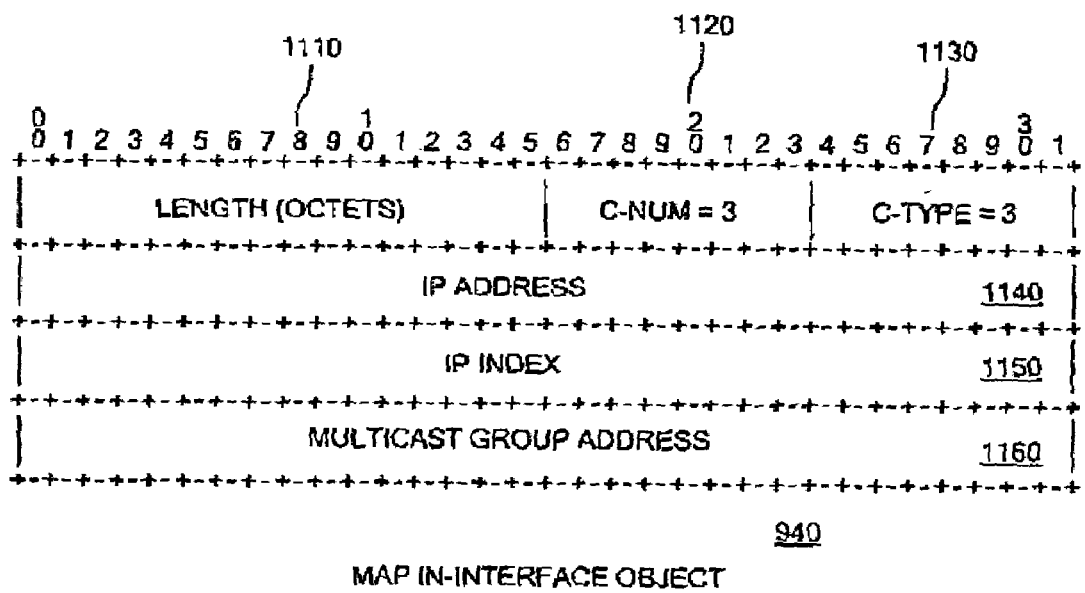
FIG. 11 is a block diagram showing the fields of an exemplary policy request message incoming interface (in-interface) object in accordance with an embodiment of the present invention.

FIG. 11 shows the format of the MAP In-Interface object 940. The MAP In-Interface object 940 includes a length field 1110, a c-num field 1120, a c-type field 1130, an IP address field 1140, an if index field 1150, and a multicast group address field 1160. The length field 1110 indicates the length of the MAP In-Interface object 940 in octets. The c-num field 1120 and c-type field 1130 identify the object as a MAP In-Interface object, where the c-num value 3 indicates a COPS In-Interface object (as opposed to another type of COPS object) and the c-type is a new (i.e., previously unused) In-Interface value (tentatively 3) that indicates a MAP In-Interface object (as opposed to another type of In-Interface object). The IP address field 1140 includes the IP address associated with the incoming interface. The if index field 1150 includes an index associated with the incoming interface. The multicast group address field 1160 includes the group-D IP address associated with the multicast group.

Figure 12:
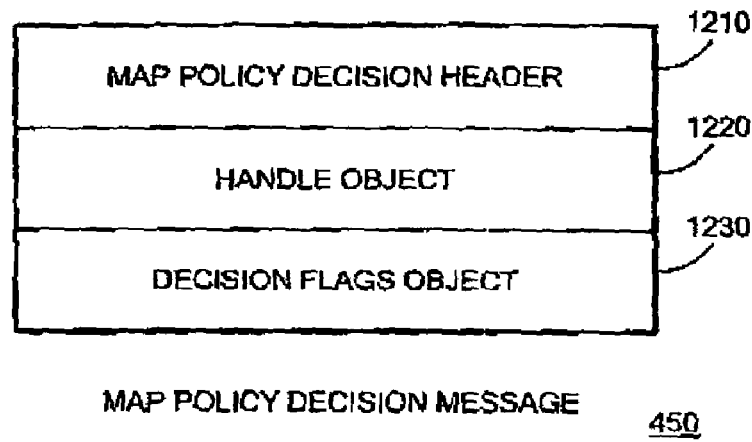
FIG. 12 is a block diagram showing the fields of an exemplary policy decision message that is sent by the policy server to the access device for indicating whether the access device should admit or reject the subscriber device in accordance with an embodiment of the present invention.

FIG. 12 shows the format of the MAP Policy Decision message 450. The MAP Policy Decision message 450 includes a MAP Policy Decision Header 1210, a Handle object 1220, and a Decision Flags object 1230. The MAP Policy Decision Header 1210 is described with reference to FIG. 13 below. The Decision Flags object 1230 is a standard COPS object that is used in an embodiment of the invention to indicate whether or not the subscriber device can be admitted to the multicast network, and is described with reference to FIG. 14 below. The handle object is a standard COPS object.

Figure 13:
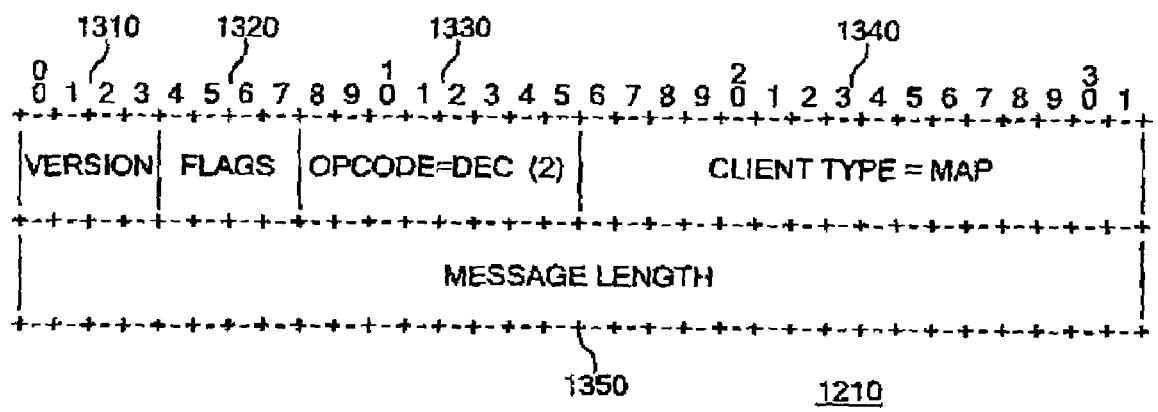
FIG. 13 is a block diagram showing the fields of an exemplary policy decision message header in accordance with an embodiment of the present invention.

FIG. 13 shows the format of the MAP Policy Decision Header 1210. The MAP Policy Decision Header 1210 includes a version field 1310, a flags field 1320, an opcode field 1330, a client type field 1340, and a message length field 1350. The opcode field 1330 identifies the MAP Policy Decision message 450 as a COPS decision (DEC) message (opcode value 2). The client type field 1340 indicates a MAP client. The remaining header fields are standard COPS header fields.

Figure 14:
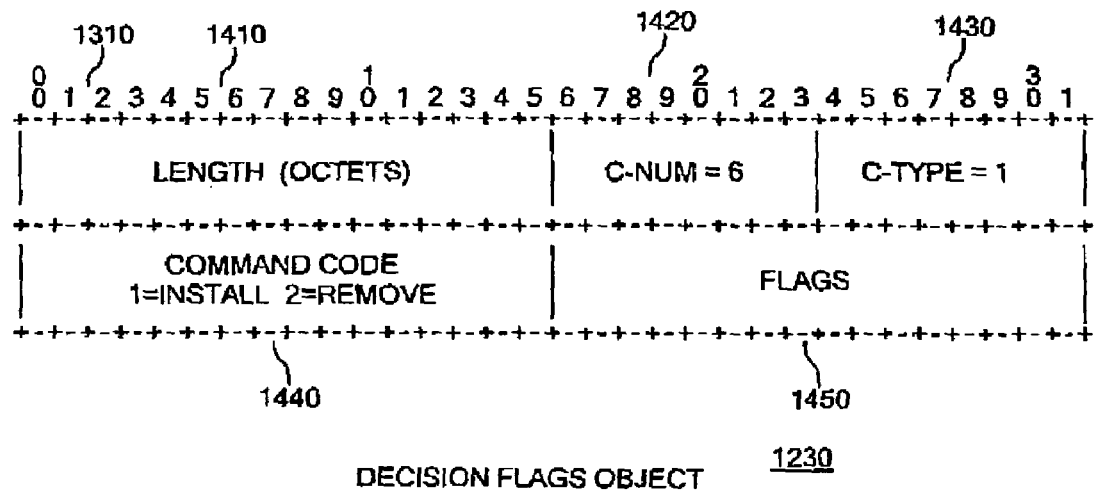
FIG. 14 is a block diagram showing the fields of an exemplary policy decision message decision flags object in accordance with an embodiment of the present invention.

FIG. 14 shows the format of the Decision Flags object 1230. The Decision Flags object 1230 includes a length field 1410, a c-num field 1420, a c-type field 1430, a command code field 1440, and a flags field 1450. The length field 1410 indicates the length of the Decision Flags object 1230 in octets. The c-num field 1420 and c-type field 1430 identify the object as a Decision Flags object, where the c-num value 6 indicates a COPS Decision object (as opposed to another type of COPS object) and the c-type value 1 indicates a Decision Flags object (as opposed to another type of Decision object). The command code field 1440 indicates the policy decision, where a value of 1 (install) is used to indicate that the subscriber device can be admitted to the multicast group, and a value of 2 (remove) is used to indicate that the subscriber device cannot be admitted to the multicast group. The flags field 1450 is a standard COPS flags field.

In an exemplary embodiment of the present invention, the described policy-based receiver access control mechanism is used for receiver access control in a PIM network. In accordance with the PIM protocol, the various routers within a particular PIM domain establish a default multicast distribution tree, referred to as a "shared tree," for each multicast group. Each shared tree is rooted at a Rendezvous Point (RP) router (i.e., the central device) that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM domain. The router receives the PIM Bootstrap Message either from a Bootstrap Router (BSR), which sends the PIM Bootstrap Message to all routers in the PIM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

Typically, a PIM router joins the shared tree when a downstream multicast client joins the shared tree. Specifically, each host accesses the shared tree through a PIM router that is referred to as the Designated Router (DR) for that host (i.e., the access device). The host and the DR support a multicast group management protocol, such as IGMP. In order to join the shared tree, the host sends a join request to the DR using the multicast group management protocol, and the DR forwards a PIM join message upstream towards the RP. Each PIM router that receives the PIM join message establishes the appropriate multicast routes for routing multicast packets to the host, and also joins the shared tree (if it is not already joined to the shared tree) by forwarding the PIM join message upstream towards the RP.

Figure 15:
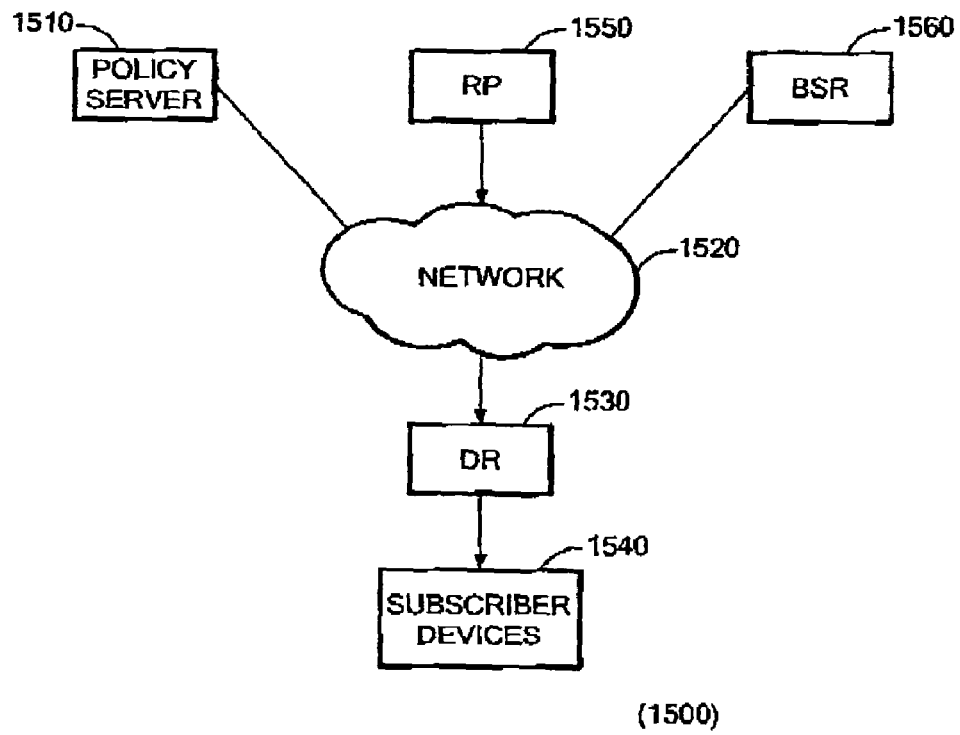
FIG. 15 is a network diagram showing an exemplary Protocol Independent Multicast (PIM) network in accordance with an embodiment of the present invention.

FIG. 15 shows an exemplary PIM communication system 1500. The PIM communication 1500 includes a DR (i.e., access device) 1530 in communication with a policy server 1510, an RP 1550, and a BSR 1560 over a network 1520. Subscriber devices 1540 access the network 1520 via the DR 1530.

In order to participate in the policy service, the DR 1530 typically establishes a policy service connection to the policy server 1510. In an exemplary embodiment of the present invention, the DR 1530 initiates the policy service connection by sending a client open message to the policy server 1510. The policy server 1510 completes the policy service connection by sending a client accept message to the access device 1530 in response to the client open message.

In order to join a multicast group, a subscriber device 1540 typically sends a join request to the DR 1530 using the multicast group management protocol (e.g., IGMP). The join request identifies the multicast group, for example, using a multicast group address.

When the DR 1530 receives the join request from the subscriber device 1540, the DR 1530 sends a policy service request message to the policy server 1510 in order to obtain a policy decision from the policy server 1510 indicating whether or not the subscriber device 1540 can be admitted to the multicast group. In an exemplary embodiment of the present invention, the policy decision is based upon the incoming interface of the DR 1530 over which the join request is received, and therefore the policy service request message indicates at least the incoming interface and the multicast group. In an alternative embodiment of the invention, the policy decision may be based upon the subscriber device 1540 itself, in which case the policy service request message would indicate at least the subscriber device 1540 and the multicast group.

In any case, when the policy server 1510 receives the policy service request message from the DR 1530, the policy server 1510 decides whether or not the subscriber device 1540 can be admitted to the multicast group based upon the information contained in the policy service request message (e.g., incoming interface, subscriber device, incoming interface) as well as policy information obtained from a policy database. The policy server 1510 sends a policy service decision message to the DR 1530 including a policy decision indicating whether or not the subscriber device 1540 can be admitted to the multicast group.

When the DR 1530 receives the policy service decision message from the policy server 1510, the DR 1530 enforces the policy decision. Specifically, the DR 1530 admits the subscriber device 1540 to the multicast group if and only if the policy decision indicates that the subscriber device 1540 can be admitted to the multicast group. Admitting the subscriber device 1540 to the multicast group typically involves establishing appropriate multicast routes for receiving multicast information and forwarding the multicast information to the subscriber device 1540, for example, by joining the shared tree for the multicast group using the PIM protocol and setting up appropriate forwarding entries for forwarding the multicast information to the subscriber device 1540 over the incoming interface.

Figure 16:
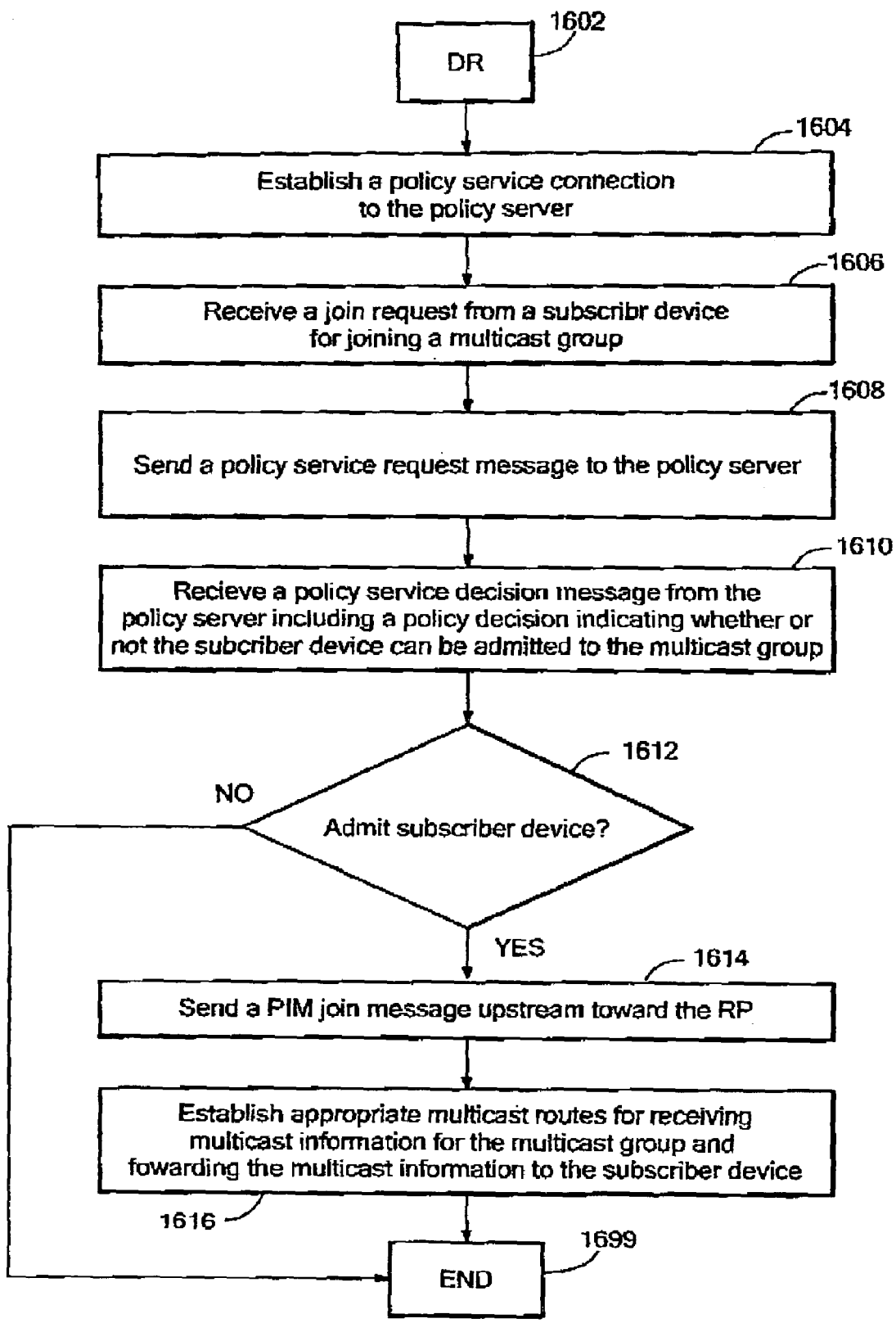
FIG. 16 is a logic flow diagram showing exemplary Designated Router (DR) logic for receiver access control in a PIM network in accordance with an embodiment of the present invention.

FIG. 16 shows exemplary DR logic 1600 for receiver access control. Beginning at block 1602, the logic establishes a policy service connection to the policy server 1510, in block 1604, for example, by sending a client open message to the policy server 1510 and receiving a client accept message from the policy server 1510. Upon receiving a join request from a subscriber device for joining a multicast group, in block 1606, the logic sends a policy service request message to the policy server 1510, in block 1608. An exemplary policy service request message indicates at least the incoming interface and multicast group for the subscriber device, although the policy service request message may additionally or alternatively indicate other information such as the subscriber device. Upon receiving a policy service decision message from the policy server 1510 including a policy decision indicating whether or not the subscriber device can be admitted to the multicast group, in block 1610, the logic decides whether or not to admit the subscriber device to the multicast group based upon the policy decison from the policy service decision message, in block 1612. If the policy decision indicates that the subscriber device can be admitted to the multicast group (YES in block 1612), then the logic admits the subscriber device to the multicast group by sending a PIM join request message upstream toward the RP, in block 1614, and establishing appropriate multicast routes for receiving multicast information for the multicast group and forwarding the multicast information to the subscriber device, in block 1616. If the policy decision indicates that the subscriber device cannot be admitted to the multicast group (NO in block 1612), then the logic does not admit the subscriber device to the multicast group. The logic 1600 terminates in block 1699.

Figure 17:
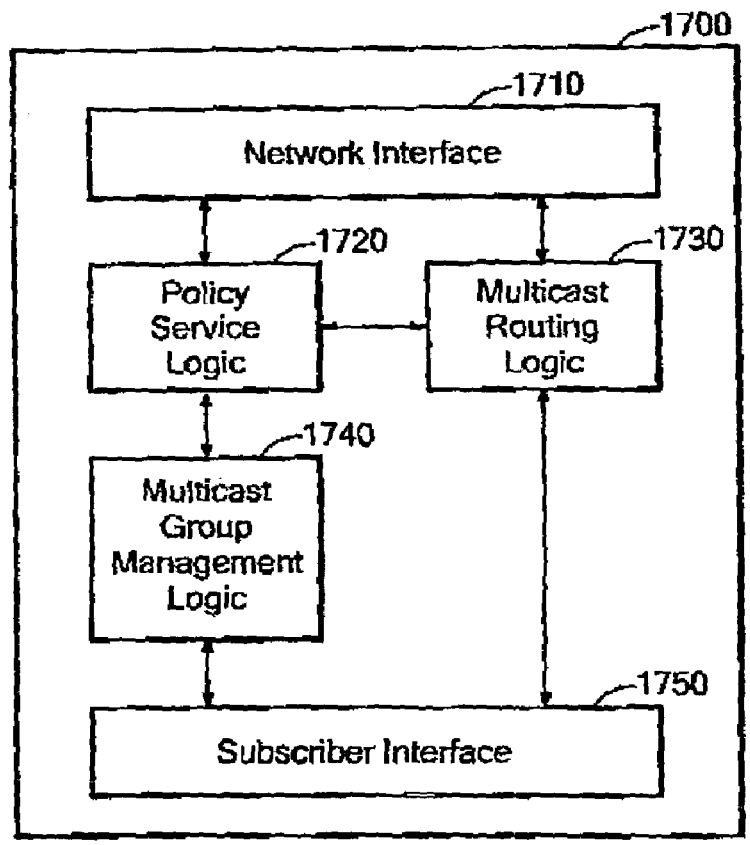
FIG. 17 is a block diagram showing the relevant logic blocks of an exemplary access device in accordance with an embodiment of the present invention.

FIG. 17 shows the relevant logic blocks of an exemplary access device 1700. The access device 1700 includes, among other things, a network interface 1710 for communicating with the policy server, policy service logic 1720, multicast routing logic 1730, multicast group management logic 1740, and a subscriber interface 1750 for communicating with subscriber devices. The policy service logic 1720, which implements a policy service protocol such as the new or extended COPS protocol as described herein, is coupled to the network interface 1710, the membership logic 1730 and the multicast group management logic 1740. The multicast routing logic 1730, which implements a multicast routing protocol such as PIM, is coupled to the network interface 1710, the policy service logic 1720, and the subscriber interface 1750. The multicast group management logic 1740, which implements a multicast group management protocol such as IGMP, is coupled to the policy service logic 1720 and to the subscriber interface 1750.

The policy service logic 1720 establishes a policy service connection to the policy server over the network interface 1710. Specifically, the policy service logic 1720 sends a client open message to the policy server over the network interface 1710 and receives a client accept message from the policy server over the network interface 1710.

The multicast group management logic 1740 receives a join request from a subscriber device over the subscriber interface 1750 and notifies the policy service logic 1720 when the join request is received. The multicast group management logic 1740 provides certain information to the policy service logic 1720, such as the incoming interface and multicast group address for the subscriber device.

Upon being notified by the multicast group management logic 1740, the policy service logic 1720 sends a policy service request message to the policy server over the network interface 1710 and receives a policy service decision message from the policy server over the network interface 1710. The policy service logic 1720 decides whether or not to admit the subscriber device to the multicast group based upon the policy decision in the policy service decision message. If the policy service logic 1720 determines that the subscriber device can be admitted to the multicast group, then the policy service logic 1720 notifies the multicast routing logic. The policy service logic 1720 provides certain information to the multicast routing logic 1730, such as the multicast group address.

Upon being notified by the policy service logic 1720, the multicast routing logic 1730 establishes appropriate multicast routes for receiving multicast information for the multicast group over the network interface 1710 and forwarding the multicast information to the subscriber device over the subscriber interface 1750. The multicast routing logic 1730 may join a shared multicast tree, for example, by sending a PIM join message upstream toward the RP over the network interface 1710. The multicast routing logic maintains routing/forwarding information that maps the subscriber interface 1750 as an outgoing interface for the multicast group so that multicast information received over the network interface 1710 is forwarded by the multicast routing logic 1730 to the subscriber device over the subscriber interface 1750.

Figure 18:
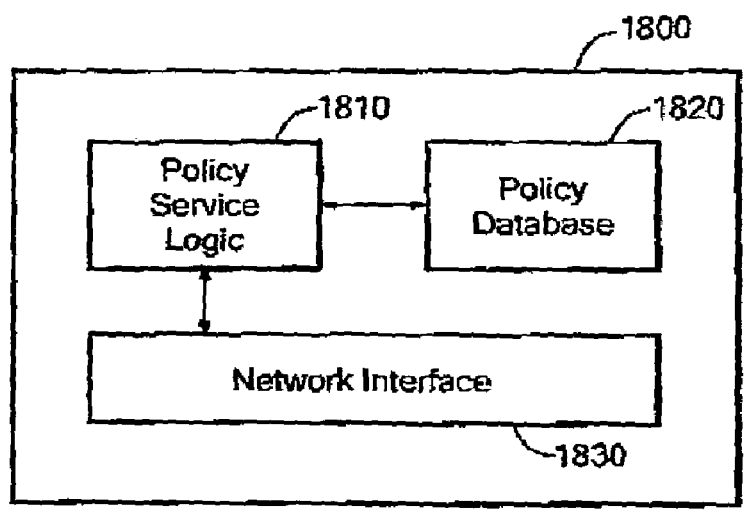
FIG. 18 is a block diagram showing the relevant logic blocks of an exemplary policy server in accordance with an embodiment of the present invention.

FIG. 18 shows the relevant logic blocks of an exemplary policy server 1800. The policy server 1800 includes, among other things, policy service logic 1810, a policy database 1820, and a network interface 1830 for communicating with the access device. The policy service logic 1810, which implements a policy service protocol such as the new or extended COPS protocol as described herein, is coupled to the policy database 1820 and to the network interface 1830.

The policy service logic 1810 receives a policy service request message from the access device over the network interface 1830 and decides whether or not the subscriber device can be admitted to the multicast group. The policy service request message includes certain information, such as an incoming interface and multicast group address for the subscriber device. The policy service logic 1810 uses the information from the policy service request message as well as policy information from the policy database 1820 to decide whether or not the subscriber device can be admitted to the multicast group. The policy service logic 1810 sends a policy service decision message including the policy decision to the access device over the network interface 1830.

It should be noted that the terms such as "router," "switch," and "server" are used herein to describe various communication devices that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the access device logic and policy server logic is implemented as a set of computer program instructions that is converted into a computer executable form, stored as such in a computer readable medium, and executed by a microprocessor within the access device and policy server, respectively, under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a communication system including a subscriber device, an access device, and a policy server, in which the policy server determines a policy decision indicating whether the subscriber device can be admitted to a multicast group and the access device controls subscriber device access to the multicast group based upon the policy decision from the policy server indicating whether the subscriber device can be admitted to the multicast group. The policy decision for admitting the subscriber device to the multicast group is based upon an incoming interface of the access device to which the subscriber device is coupled and/or the subscriber device itself. The access device admits the subscriber device to the multicast group if and only if the policy decision from the policy server indicates that the subscriber device can be admitted to the multicast group, and establishes appropriate multicast routes for receiving multicast information for the multicast group and forwarding the multicast information for the multicast group to the subscriber device upon admitting the subscriber device to the multicast group.

In a typical embodiment, the subscriber device sends a join request message to the access device for joining the multicast group. The access device receives the join request message from the subscriber device over an incoming interface and sends a policy service request message to the policy server indicating at least the incoming interface and the multicast group. The policy server receives the policy service request message from the access device, determines the policy decision indicating whether the subscriber device can be admitted to the multicast group based upon at least the incoming interface and the multicast group indicated in the policy service request message, and sends a policy service decision message to the access device including the policy decision indicating whether the subscriber device can be admitted to the multicast group. The access device receives the policy service decision message from the policy server and admits the subscriber device to the multicast group if and only if the policy decision in the policy service decision message indicates that the subscriber device can be admitted to the multicast group. The join request message is typically an Internet Group Management Protocol (IGMP) join request. The policy service request message is typically a Common Open Policy Service (COPS) request message indicating at least the multicast group, but preferably including an address for the incoming interface, an index for the incoming interface, and an address for the multicast group. The policy service decision message is typically a Common Open Policy Service (COPS) decision message including the policy decision, preferably in the form of a command code indicating whether to admit (install) the subscriber device or reject (remove) the subscriber device.

In order to exchange policy service information including the policy service request message and the policy service decision message, the access device and the policy server establish a policy service connection. This typically involves sending a client open message by the access device to the policy server, and sending a client accept message by the policy server to the access device. The client open message is typically a Common Open Policy Service (COPS) client-open message including a client type indicating that the access device is a multicast access point device, and the client accept message is typically a COPS client-accept message.

In order to receive and forward multicast information for the multicast group, the access device typically joins the multicast group upon admitting the subscriber device to the multicast group using a multicast routing protocol. In a PIM network, the access device joins the multicast group by sending a PIM join request upstream toward a rendezvous point device in order to join the multicast group.

The present invention may also be embodied as a method for providing access control by an access device in a multicast communication system. The method involves receiving a join request message for joining a multicast group from a subscriber device over an incoming interface, obtaining from a policy server a policy decision indicating whether the subscriber device can be admitted to the multicast group, and admitting the subscriber device to the multicast group if and only if the policy decision indicates that the subscriber device can be admitted to the multicast group. Obtaining the policy decision from the policy server involves establishing a policy service connection to the policy server, sending a policy service request message to the policy server indicating at least the multicast group, and receiving a policy service decision message from the policy server indicating whether the subscriber device can be admitted to the multicast group. Establishing the policy service connection to the policy server involves sending a client open message to the policy server and receiving a client accept message from the policy server. Admitting the subscriber device to the multicast group typically involves joining the multicast group and establishing appropriate multicast routes for receiving multicast information and forwarding the multicast information to the subscriber device.

The present invention may also be embodied as an apparatus having an incoming interface, multicast group management logic for receiving a join request message for joining a multicast group from a subscriber device over the incoming interface, policy service logic for obtaining from a policy server a policy decision indicating whether the subscriber device can be admitted to the multicast group, and multicast routing logic for admitting the subscriber device to the multicast group if and only if the policy decision indicates that the subscriber device can be admitted to the multicast group. The multicast group management logic is typically Internet Group Management Protocol (IGMP) logic. The policy service logic is typically new or extended COPS logic that obtains the policy decision from the policy server by sending a policy service request message to the policy server indicating at least the multicast group and receiving a policy service decision message from the policy server indicating whether the subscriber device can be admitted to the multicast group. The multicast routing logic typically joins the multicast group and establishes appropriate multicast routes for receiving multicast information and forwarding the multicast information to the subscriber device upon admitting the subscriber device to the multicast group.

The present invention may also be embodied as a computer program for controlling a computer system. The computer program includes multicast group management logic for receiving a join request message for joining a multicast group from a subscriber device over an incoming interface, policy service logic for obtaining from a policy server a policy decision indicating whether the subscriber device can be admitted to the multicast group, and multicast routing logic for admitting the subscriber device to the multicast group if and only if the policy decision indicates that the subscriber device can be admitted to the multicast group. The multicast group management logic is typically Internet Group Management Protocol (IGMP) logic. The policy service logic is typically new or extended COPS logic that obtains the policy decision from the policy server by sending a policy service request message to the policy server indicating at least the multicast group and receiving a policy service decision message from the policy server indicating whether the subscriber device can be admitted to the multicast group. The multicast routing logic typically joins the multicast group and establishes appropriate multicast routes for receiving multicast information and forwarding the multicast information to the subscriber device upon admitting the subscriber device to the multicast group.

The present invention may also be embodied as a method for providing access control by a policy server in a multicast communication system. The method involves establishing a policy service connection with an access device, receiving from the access device a policy service request message indicating at least a multicast group associated with a subscriber device, determining a policy decision indicating whether the subscriber device can be admitted to the multicast group based upon at least the multicast group indicated in the policy service request message, and sending a policy service decision message to the access device including the policy decision indicating whether the subscriber device can be admitted to the multicast group.

The present invention may also be embodied as an apparatus having a policy database containing policy information and policy service logic for determining a policy decision indicating whether a subscriber device can be admitted to a multicast group based upon the policy information contained in the policy database. The policy service logic is typically new or extended COPS logic that includes connection establishment logic for establishing a policy service connection with the access device, receiving logic for receiving a policy service request message from an access device indicating at least a multicast group associated with the subscriber device, policy determination logic for determining a policy decision indicating whether the subscriber device can be admitted to the multicast group based upon the policy information contained in the policy database and at least the multicast group indicated in the policy service request message, and sending logic for sending a policy service decision message to the access device including the policy decision indicating whether the subscriber device can be admitted to the multicast group.

The present invention may also be embodied as a computer program for controlling a computer system. The computer program includes policy service logic for determining a policy decision indicating whether a subscriber device can be admitted to a multicast group based upon policy information contained in a policy database. The policy service logic is typically new or extended COPS logic that includes connection establishment logic for establishing a policy service connection with the access device, receiving logic for receiving a policy service request message from an access device indicating at least a multicast group associated with the subscriber device, policy determination logic for determining a policy decision indicating whether the subscriber device can be admitted to the multicast group based upon the policy information contained in the policy database and at least the multicast group indicated in the policy service request message, and sending logic for sending a policy service decision message to the access device including the policy decision indicating whether the subscriber device can be admitted to the multicast group.

The present invention may also be embodied as a data signal comprising a policy service request message for requesting a policy decision in a multicast communication system, the policy service request message comprising at least a multicast group indicator. The policy service request message typically includes at least the multicast group indicator, and preferably includes an address for the incoming interface, an index for the incoming interface, and an address for the multicast group.

The present invention may be embodied in other specific forms without departing from the true scope of the invention. The described embodiments are to be considered in all respects only as illustrative and not restrictive.

We claim:

1. A communication system comprising:
a subscriber device;
an access device;
a policy server, wherein the policy server is operably coupled to determine a policy decision indicating whether the subscriber device can be admitted to a multicast group, and wherein the access device is operably coupled to control subscriber device access to the multicast group based upon the policy decision from the policy server indicating whether the subscriber device can be admitted to the multicast group; and wherein the subscriber device is operably coupled to send a join request message to the access device for joining the multicast group, the access device is operably coupled to receive the join request message from the subscriber device over an incoming interface and send a policy service request message to the policy server indicating at least the incoming interface and the multicast group, the policy server is operably coupled to receive the policy service request message from the access device, determine the policy decision indicating whether the subscriber device can be admitted to the multicast group based upon at least the incoming interface and the multicast group indicated in the policy service request message, and send a policy service decision message to the access device including the policy decision indicating whether the subscriber device can be admitted to the multicast group, and the access device is operably coupled to receive the policy service decision message from the policy server and admit the subscriber device to the multicast group if and only if the policy decision in the policy service decision message indicates that the subscriber device can be admitted to the multicast group.

2. The communication system of claim 1, wherein the policy decision for admitting the subscriber device to the multicast group is based upon an interface of the access device to which the subscriber device is coupled.

3. The communication system of claim 1, wherein the access device is operably coupled to admit the subscriber device to the multicast group if and only if the policy decision from the policy server indicates that the subscriber device can be admitted to the multicast group.

4. The communication system of claim 3, wherein the access device is operably coupled to establish appropriate multicast routes for receiving multicast information for the multicast group and forwarding the multicast information for the multicast group to the subscriber device upon admitting the subscriber device to the multicast group.

5. The communication system of claim 1, wherein the join request message comprises an Internet Group Management Protocol (IGMP) join request.

6. The communication system of claim 1, wherein the policy service request message comprises a Common Open Policy Service (COPS) request message indicating at least the multicast group.

7. The communication system of clam 6, wherein the COPS request message comprises:

an address for the incoming interface;

an index for the incoming interface; and an address for the multicast group.

8. The communication system of claim 1, wherein the policy service decision message comprises a Common Open Policy Service (COPS) decision message including the policy decision.

9. The communication system of claim 8, wherein the COPS decision message comprises a command code indicating whether to admit (install) the subscriber device or reject (remove) the subscriber device.

10. The communication system of claim 1, wherein the access device and the policy server are operably coupled to establish a policy service connection for exchanging policy service messages including the policy service request message and the policy service decision message.

11. The communication system of claim 10, wherein the access device is operably coupled to send a client open message to the policy server in order to open the policy service connection, and wherein the policy server is operably coupled to send a client accept message to the access device in order to accept the policy service connection.

12. The communication system of claim 11, wherein the client open message comprises a Common Open Policy Service (COPS) client-open message including a client type indicating that the access device is a multicast access point device, and wherein the client accept message comprises a COPS client-accept message.

13. The communication system of claim 1, wherein the access device is operably coupled to join the multicast group upon admitting the subscriber device to the multicast group.

14. The communication system of claim 13, wherein the access device is operably coupled to send a Protocol Independent Multicast (PEM) join request message upstream toward a rendezvous point device in order to join the multicast group.

15. A method for providing access control by an access device in a multicast communication system, the method comprising:

receiving a join request message for joining a multicast group from a subscriber device over an incoming interface;

obtaining from a policy server a policy decision indicating whether the subscriber device can be admitted to the multicast group;

admitting the subscriber device to the multicast group if and only if the policy decision indicates that the subscriber device can be admitted to the multicast group; and wherein obtaining the policy decision from the policy server comprises establishing a policy service connection to the policy server, sending a policy service request message to the policy server indicating at least the multicast group, and receiving a policy service decision message from the policy server indicating whether the subscriber device can be admitted to the multicast group.

16. The method of claim 15, wherein the join request message comprises an Internet Group Management Protocol (IGMP) join request message indicating the multicast group.

17. The method of claim 15, wherein establishing the policy service connection to the policy server comprises:

sending a client open message to the policy server; and receiving a client accept message from the policy server.

18. The method of claim 17, wherein the client open message comprises a Common Open Policy Service (COPS) client-open message including a client type indicating that the access device is a multicast access point device, and wherein the client accept message comprises a COPS client-accept message.

19. The method of claim 15, wherein the policy service request message comprises a Common Open Policy Service (COPS) request message indicating at least the multicast group.

20. The method of claim 19, wherein the COPS request message comprises:
an address for the incoming interface;
an index for the incoming interface; and an address for the multicast group.

21. The method of claim 15, wherein the policy service decision message comprises a Common Open Policy Service (COPS) decision message indicating the policy decision for the subscriber device.

22. The method of claim 21, wherein the COPS decision message comprises a command code indicating whether to admit (install) the subscriber device or reject (remove) the subscriber device.

23. The method of claim 15, wherein admitting the subscriber device to the multicast group comprises:
joining the multicast group; and
establishing appropriate multicast routes for receiving multicast information and forwarding the multicast information to the subscriber device.

24. The method of claim 23, wherein joining the multicast group comprises:
sending a Protocol Independent Multicast (PEM) join request message upstream toward a rendezvous point device in order to join the multicast group.

25. An apparatus comprising:
an incoming interface:
multicast group management logic operably coupled to receive a join request message for joining a multicast group from a subscriber device over the incoming interface;
policy service logic operably coupled to obtain from a policy server a policy decision indicating whether the subscriber device can be admitted to the multicast group;
multicast routine logic operably coupled to admit the subscriber device to the multicast group if and only if the policy decision indicates that the subscriber device can be admitted to the multicast group; and
wherein the policy service logic is operably coupled to send a policy service request message to the policy server indicating at least the multicast group and receive a policy service decision message from the policy server indicating whether the subscriber device can be admitted to the multicast group.

26. The apparatus of claim 25, wherein the multicast group management logic comprises Internet Group Management Protocol (IGMP) logic, and wherein the join request message comprises an Internet Group Management Protocol (IGMP) join request message indicating the multicast group.

27. The apparatus of claim 25, wherein the policy service logic comprises extended Common Open Policy Service (COPS) logic.

28. The apparatus of claim 27, wherein the policy service request message comprises a COPS request message indicating at least the multicast group.

29. The apparatus of claim 28, wherein the COPS request message comprises:
an address for the incoming interface;
an index for the incoming interface; and an address for the multicast group.

30. The apparatus of claim 25, wherein the policy service decision message comprises a COPS decision message indicating the policy decision for the subscriber device.

31. The apparatus of claim 30, wherein the COPS decision message comprises a command code indicating whether to admit (install) the subscriber device or reject (remove) the subscriber device.

32. The apparatus of claim 25, wherein the multicast routing logic is operably coupled to join the multicast group and establish appropriate multicast routes for receiving multicast information and forwarding the multicast information to the subscriber device.

33. The apparatus of claim 32, wherein the multicast routing logic comprises Protocol Independent Multicast (PIM) logic.

34. The apparatus of claim 33, wherein the multicast routing logic is operably coupled to send a PIM join request message upstream toward a rendezvous point device in order to join the multicast group.

35. The apparatus of claim 25, wherein the policy service logic is operably coupled to establish and maintain a policy service connection with the policy server for exchanging policy service messages including the policy service request message and the policy service decision message.

36. The apparatus of claim 35, wherein the policy service logic is operably coupled to send a client open message to the policy server in order to establish the policy service connection.

37. The apparatus of claim 36, wherein the client open message comprises a Common Open Policy Service (COPS) client-open message including a client clear type indicating that the apparatus is a multicast access point device.

38. A computer program for controlling a computer system, the computer program comprising:
multicast group management logic programmed to receive a join request message for joining a multicast group from a subscriber device over an incoming interface;
policy service logic programmed to obtain from a policy server a policy decision indicating whether the subscriber device can be admitted to the multicast group;
multicast routing logic programmed to admit the subscriber device to the multicast group if and only if the policy decision indicates that the subscriber device can be admitted to the multicast group; and
wherein the policy service logic is programmed to send a policy service request message to the policy server indicating at least the multicast group and receive a policy service decision message from the policy server indicating whether the subscriber device can be admitted to the multicast group.

39. The computer program of claim 38, wherein the multicast group management logic comprises Internet Group Management Protocol (IGMP) logic, and wherein the join request message comprises an Internet Group Management Protocol (IGMP) join request message indicating the multicast group.

40. The computer program of claim 38, wherein the policy service logic comprises extended Common Open Policy Service (COPS) logic.

41. The computer program of claim 40, wherein the policy service request message comprises a COPS request message indicating at least the multicast group.

42. The computer program of claim 41, wherein the COPS request message comprises:
an address for the incoming interface;
an index for the incoming interface; and an address for the multicast group.

43. The computer program of claim 38, wherein the policy service decision message comprises a COPS decision message indicating the policy decision for the subscriber device.

44. The computer program of claim 43, wherein the COPS decision message comprises a command code indicating whether to admit (install) the subscriber device or reject (remove) the subscriber device.

45. The computer program of claim 38, wherein the multicast routing logic is programmed to join the multicast group and establish appropriate multicast routes for receiving multicast information and forwarding the multicast information to the subscriber device.

46. The computer program of claim 45, wherein the multicast routing logic comprises Protocol Independent Multicast (PIM) logic.

47. The computer program of claim 46, wherein the membership logic is programmed to send a PIM join request message upstream toward a rendezvous point device in order to join the multicast group.

48. The computer program of claim 38, wherein the policy service logic is programmed to establish and maintain a policy service connection with the policy server for exchanging policy service messages including the policy service request message and the policy service decision message.

49. The computer program of claim 48, wherein the policy service logic is programmed to send a client open message to the policy server in order to establish the policy service connection.

50. The computer program of claim 49, wherein the client open message comprises a Common Open Policy Service (COPS) client-open message including a client type indicating that the apparatus is a multicast access point device.

* * * * *